US011966902B2

(12) United States Patent
Yasuda

(10) Patent No.: US 11,966,902 B2
(45) Date of Patent: Apr. 23, 2024

(54) INFORMATION PROVIDING APPARATUS AND INFORMATION PROVIDING METHOD

(71) Applicant: TOSHIBA TEC KABUSHIKI KAISHA, Tokyo (JP)

(72) Inventor: Takahiro Yasuda, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 98 days.

(21) Appl. No.: 17/179,228

(22) Filed: Feb. 18, 2021

(65) Prior Publication Data

US 2021/0304177 A1   Sep. 30, 2021

(30) Foreign Application Priority Data

Mar. 24, 2020   (JP) ................................ 2020-053270

(51) Int. Cl.
  *G06Q 20/20*   (2012.01)
  *G06K 7/10*    (2006.01)
  *G06K 7/14*    (2006.01)
  *G06Q 20/04*   (2012.01)

(52) U.S. Cl.
  CPC ......... *G06Q 20/209* (2013.01); *G06K 7/1095* (2013.01); *G06K 7/1447* (2013.01); *G06Q 20/047* (2020.05)

(58) Field of Classification Search
  CPC .. G06Q 20/209; G06Q 20/047; G06K 7/1095; G06K 7/1447
  See application file for complete search history.

(56) References Cited

U.S. PATENT DOCUMENTS

| 11,151,544 B2* | 10/2021 | Grabovski | ......... G06Q 30/0207 |
| 2016/0203680 A1 | 7/2016 | Sambe | |
| 2016/0343061 A1* | 11/2016 | Suzuki | ............... G06Q 30/0633 |
| 2017/0221039 A1* | 8/2017 | Sambe | ................. G06K 7/1408 |

FOREIGN PATENT DOCUMENTS

| CN | 105787775 A | 7/2016 |
| CN | 106169141 A | 11/2016 |
| JP | 2009-271744 A | 11/2009 |
| JP | 2016-128954 A | 7/2016 |

OTHER PUBLICATIONS

Notice of Reasons for Refusal mailed Jan. 30, 2024 in corresponding Japanese Patent Application No. 2020-053270, 8 pages (with Translation).

* cited by examiner

*Primary Examiner* — A. Hunter Wilder
*Assistant Examiner* — Joseph M Mutschler
(74) *Attorney, Agent, or Firm* — Kim & Stewart LLP

(57) ABSTRACT

In accordance with an embodiment, a communication interface, an input device, and a processor are provided. The processor collects electronic receipt data containing a commodity code for identifying an already traded transaction target commodity from a plurality of data management apparatuses via the communication interface. The processor generates history data on the basis of the collected electronic receipt data, the history data indicating a transaction history of the commodity identified by the commodity code acquired via the input device.

6 Claims, 7 Drawing Sheets

INFORMATION PROVIDING APPARATUS AND INFORMATION PROVIDING METHOD

CROSS-REFERENCE TO RELATED APPLICATION

This application is based upon and claims the benefit of priority from the prior Japanese Patent Application No. 2020-053270, filed on Mar. 24, 2020, the entire contents of which are incorporated herein by reference.

FIELD

An embodiment described here generally relates to an information providing apparatus and an information providing method.

BACKGROUND

Electronic receipt services in which electronic receipt data obtained by digitizing receipts related to transactions such as commodity sales can be arbitrarily viewed have already been realized. Such electronic receipt services are individually provided by a plurality of service providers. In general, which electronic receipt service is applied depends on circumstances of sellers and the like and cannot be selected by customers.

For example, an electronic receipt service A is applied to a transaction with a seller X that is a member of the electronic receipt service A and an electronic receipt service B is applied to a transaction with a seller Y that is a member of the electronic receipt service B. In this case, a customer who uses both the seller X and the seller Y must use both the electronic receipt service A and the electronic receipt service B. If the customer wishes to check the past purchase history in a case where the customer purchases again a commodity that the customer has purchased from both the seller X and the seller Y, the customer needs to check the purchase history at each of the electronic receipt service A and the electronic receipt service B. Therefore, it is very troublesome for the customer to check the purchase history. In view of such circumstances, it is desirable to reduce the time and effort of the customer to check the transaction history.

DETAILED DESCRIPTION

In accordance with one embodiment, an information providing apparatus receives, from a plurality of data management apparatus, each of which manages electronic receipt data obtained by digitizing a receipt related to a transaction of a commodity, the electronic receipt data and provides information for checking a transaction history of the commodity to a user on the basis of the electronic receipt data.

The information providing apparatus includes a communication interface, a storage device, an input device, and a processor. The communication interface communicates with the plurality of data management apparatuses, and receives a plurality of pieces of electronic receipt data from the plurality of data management apparatuses, the electronic receipt data containing a commodity code of an already traded transaction target commodity and transaction data of the already traded transaction target commodity, the commodity code being an identifier for identifying the commodity. The storage device stores the transaction data in association with the commodity code. The input device inputs information for identifying the commodity in order to designate the commodity the transaction history of which is to be checked. The processor collects the plurality of pieces of electronic receipt data from the plurality of data management apparatuses via the communication interface. The processor causes the storage device to store a plurality of pieces of transaction data, each of which is the transaction data, in association with the commodity code, the plurality of pieces of transaction data being contained in the plurality of pieces of electronic receipt data collected. In a case where the input device inputs the information for identifying the commodity, the processor acquires the commodity code on the basis of the input information. In addition, the processor generates history data indicating the transaction history of the commodity identified by the acquired commodity code on the basis of the transaction data stored in the storage device in association with the acquired commodity code and outputs the generated history data.

Figure 1:
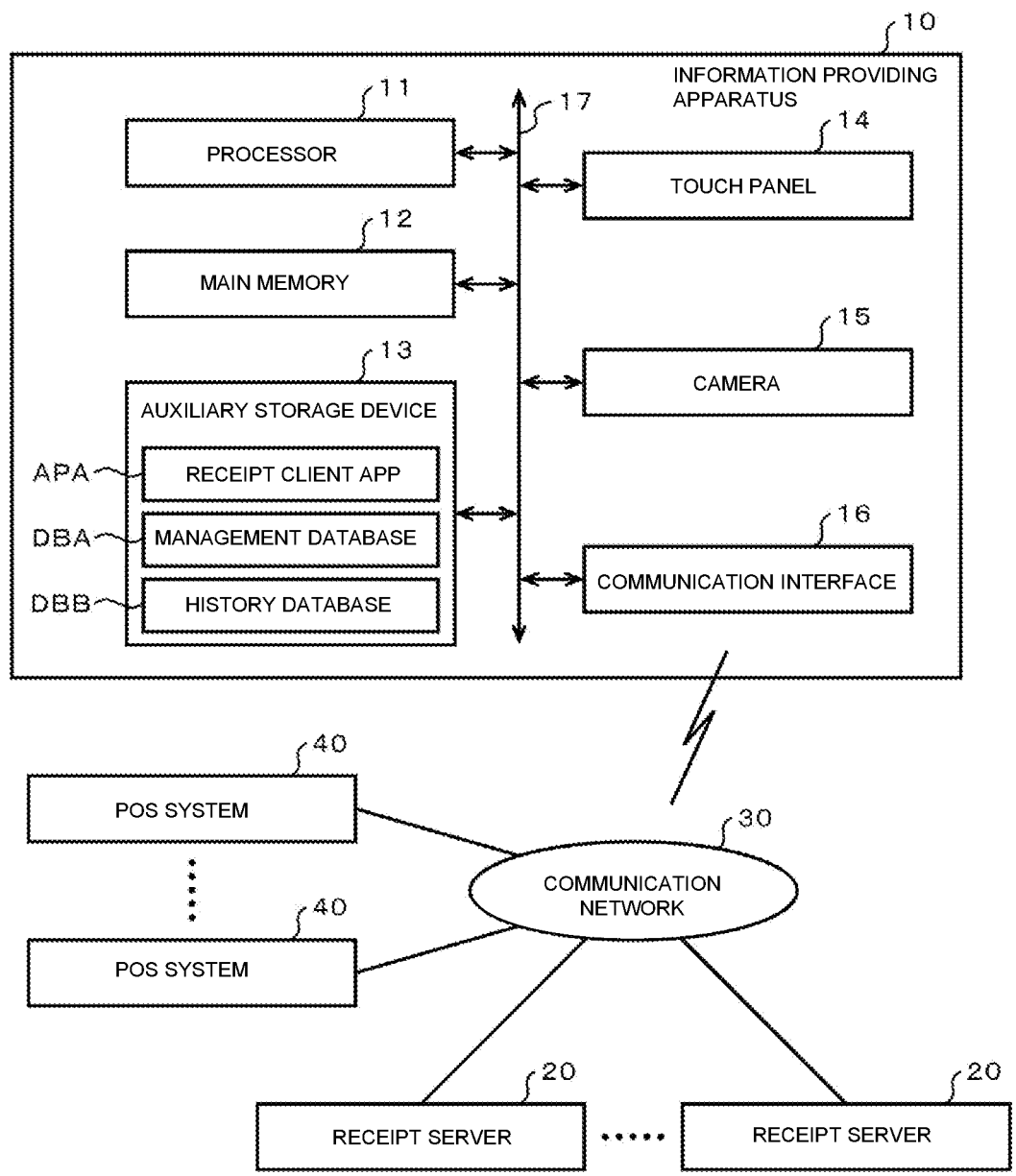
FIG. 1 is a block diagram showing a circuit configuration of an information providing apparatus according to an embodiment.

Hereinafter, an information processing apparatus according to an example of an embodiment will be described with reference to the drawings. The same reference signs in the drawings will denote the same or similar portions. FIG. 1 is a block diagram showing a circuit configuration of an information providing apparatus 10 according to the embodiment. The information providing apparatus 10 provides a user with a purchase history of a designated commodity from a plurality of receipt servers 20 on the basis of electronic receipt data collected through a communication interface 16 via a communication network 30.

The receipt server 20 acquires transaction data indicating the contents of transactions managed by a POS system 40 via the communication network 30 and stores electronic receipt data based on the transaction data. The electronic receipt data contains commodity codes of already traded transaction target commodities and transaction data for each transaction. The transaction data contains the number of commodities, a unit price, and the like with respect to each of the already traded transaction target commodities. The commodity code is an identifier assigned to a commodity for identifying the commodity. The plurality of receipt servers 20 is operated by different service providers. The plurality of receipt servers 20 provides different electronic receipt services. The electronic receipt services each includes a service that manages the electronic receipt data. It should be noted that the receipt server 20 may collect and store the electronic receipt data generated by the POS system 40. That is, the receipt server 20 is an example of a data management apparatus that manages electronic receipt data containing identifiers of commodities that have been traded as transaction targets.

The Internet, a virtual private network (VPN), a local area network (LAN), a public communication network, a mobile communication network, and the like can be used alone or in any combination as appropriate as the communication network 30. It should be noted that the mobile communication network and the Internet are, for example, used for communication between the information providing apparatus 10 and the receipt server 20 and the Internet or the VPN is, for example, used for communication between the receipt server 20 and the POS system 40.

The POS system 40 is a sales data processing apparatus that performs processing for registration, check-out, and the like of the contents of transactions such as commodity sales in a store. In a case where a customer who is a transaction target is an electronic receipt service user, the POS system 40 transmits transaction data indicating the content of the transaction to the receipt server 20. A plurality of POS systems 40 respectively processes transactions in different stores. The POS system 40 causes the receipt server 20 compatible with the electronic receipt service of which the store is a member to acquire the transaction data.

A portable information processing apparatus such as a smartphone, a mobile phone, and a tablet terminal is typically used as hardware of the information providing apparatus 10. As shown in FIG. 1, the information providing apparatus 10 includes a processor 11, a main memory 12, an auxiliary storage device 13, a touch panel 14, an input device (e.g., camera 15), the communication interface 16, a transmission line 17, and the like. The processor 11, the main memory 12, the auxiliary storage device 13, the touch panel 14, the camera 15, and the communication interface 16 are connected to one another via the transmission line 17.

In the information providing apparatus 10, a computer for performing information processing for realizing various functions as the information providing apparatus 10 is configured by connecting the processor 11, the main memory 12, and the auxiliary storage device 13 to one another via the transmission line 17.

The processor 11 corresponds to a central portion of the computer. The processor 11 controls each unit to realize the various functions as the information providing apparatus 10 in accordance with information processing programs such as an operating system, middleware, and an application program.

The main memory 12 corresponds to a main storage portion of the computer. The main memory 12 includes a non-volatile memory area and a volatile memory area. The main memory 12 stores the information processing programs in the non-volatile memory area. Moreover, the main memory 12 sometimes stores data necessary for the processor 11 to perform the processing for controlling each unit in the non-volatile or volatile memory area. The volatile memory area of the main memory 12 is used as a work area in which data is rewritten by the processor 11 as appropriate.

The auxiliary storage device 13 corresponds to an auxiliary storage portion of the computer. The auxiliary storage device 13 is, for example, an electric erasable programmable read-only memory (EEPROM). A hard disc drive (HDD), a solid state drive (SSD) or the like may be used as the auxiliary storage device 13. The auxiliary storage device 13 stores data to be used by the processor 11 for performing various types of processing and data generated by processing at the processor 11. The auxiliary storage device 13 stores the information processing programs.

One of the information processing programs stored in the auxiliary storage device 13 is an application program (hereinafter, referred to as receipt client app) APA for operation as a receipt client. It should be noted that the receipt client app APA is typically downloaded via the Internet, for example, and written to the auxiliary storage device 13 in response to an operation made by a user of the information providing apparatus 10. That is, the transfer of the information providing apparatus 10 to the user of the information providing apparatus 10 is performed in a state in which the receipt client app APA is not stored in the auxiliary storage device 13. However, the information providing apparatus 10 in a state in which the receipt client app APA is stored in the auxiliary storage device 13 may be transferred to the user of the information providing apparatus 10.

The touch panel 14 functions as an input device and a display device of the information providing apparatus 10. The camera 15 is an example of an input device that inputs information for identifying a commodity in order to designate the commodity the transaction history of which is to be checked. The camera 15 takes an image of an arbitrary subject (commodity) and generates image data indicating the image including the subject. A well-known image pick-up device using a complementary metal oxide semiconductor (CMOS) image sensor or the like can be used as the camera 15.

The communication interface 16 performs data communication via the communication network 30. For example, the communication interface communicates with a plurality of receipt servers 20 and receives a plurality of pieces of electronic receipt data from the receipt servers 20. For example, a well-known communication device for performing data communication via a mobile communication network can be used as the communication interface 16. The transmission line 17 includes an address bus, a data bus, a control signal line, and the like and transmits data and control signals exchanged between the respective connected units.

The auxiliary storage device 13 stores a management database DBA and a history database DBB in a part of its storage area. The management database DBA is a database for managing an electronic receipt service used by the user of the information providing apparatus 10. The history database DBB is a database for storing a commodity transaction history (hereinafter, sometimes referred to as purchase history) of the user of the information providing apparatus 10. That is, the auxiliary storage device 13 is an example of a storage device that stores a database that manages the transaction history.

Figure 2:
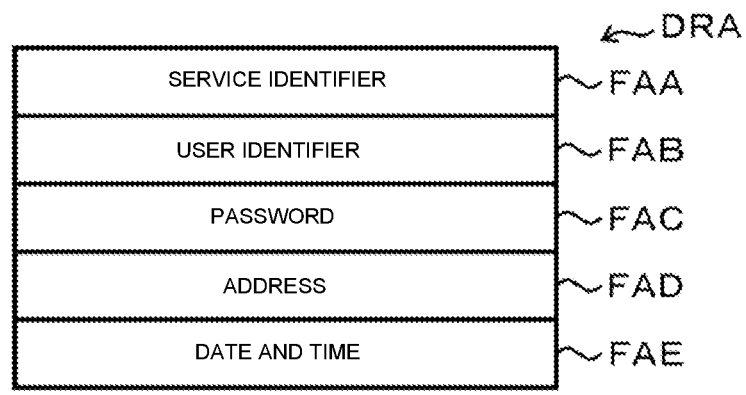
FIG. 2 is a diagram schematically showing a structure of a data record contained in a management database according to the embodiment.

FIG. 2 is a diagram schematically showing a structure of a management data record DRA (hereinafter, simply referred to as data record DRA) contained in the management database DBA. The management database DBA is a set of data records DRA with which a plurality of electronic receipt services provided by the plurality of receipt servers 20 is associated, respectively. As shown in FIG. 2, each data record DRA has fields FAA, FAB, FAC, FAD, and FAE. A service identifier for identifying the associated electronic receipt service is set in the field FAA. A user identifier for identifying the user in the associated electronic receipt service is set in the field FAB. A password defined for the user in the associated electronic receipt service is set in the field FAC. Address data for accessing the receipt server 20 compatible with the associated electronic receipt service is set in the field FAD. The address data is, for example, a uniform resource locator (URL). Information about the latest date and time when the electronic receipt data was downloaded for the associated electronic receipt service, i.e., the latest date and time when the electronic receipt data was collected from the receipt server 20 is set in the field FAE.

Figure 3:
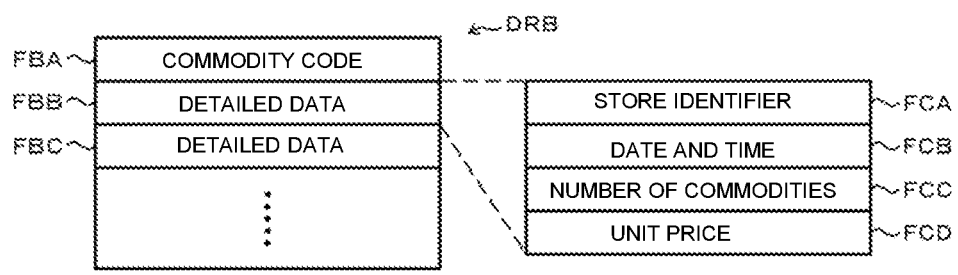
FIG. 3 is a diagram schematically showing a structure of a data record contained in a history database according to the embodiment.

FIG. 3 is a diagram schematically showing a structure of a history data record DRB (hereinafter, simply referred to as data record DRB) contained in the history database DBB. The history database DBB is a set of data records DRB with which commodities are associated, respectively. The data record DRB has fields FBA and FBB. The data record DRB sometimes contains one or more fields including a field FBC and fields subsequent to the field FBC. A commodity code for identifying the associated commodity is set in the field FBA. The commodity code is typically a Japanese article number (JAN) code or an in-store code. Detailed data is set in the field FBB. The detailed data is associated with one transaction in which the associated commodity has been a transaction target, and indicates details related to the transaction data of the transaction. The in-store code is an example of special commodity codes (special identifiers) that can be used for identifying different commodities in a plurality of stores.

In the embodiment, the detailed data has fields FCA, FCB, FCC, FCD. A store identifier for identifying a store where the associated transaction has been performed is set in the field FCA. Data indicating the date and time when the associated transaction was performed is set in the field FCB. A numerical value indicating the number of commodities traded in the associated transaction is set in the field FCC. A numerical value indicating a unit price applied in the associated transaction is set in the field FCD.

Next, an operation of the information providing apparatus 10 configured as described above will be described. It should be noted that the contents of the processing to be described below is an example and various types of processing capable of obtaining a similar result can be used as appropriate.

First, the user installs the receipt client app APA in an information processing apparatus such as a smartphone owned by the user and enables the information processing apparatus to function as the information providing apparatus 10. Moreover, the user performs user registration for a service of the electronic receipt services provided by the plurality of receipt servers 20, respectively, that the user wishes to use. In a case where the user uses a plurality of electronic receipt services, the user performs user registration for each of the corresponding electronic receipt services. With this user registration, a user identifier for identifying the user in the receipt server 20 is set and a password is associated with the user identifier. At least either one of the user identifier or the password may be designated by the user or both may be set by the receipt server 20 or the service provider.

The user registers an electronic receipt service to be used and the user identifier and the password in the electronic receipt service as use settings of the information providing apparatus 10. In response to an operation for this registration, the processor 11 adds a new data record DRA to the management database DBA. The processor 11 sets the service identifier of the electronic receipt service designated by the user in the field FAA of the new data record DRA. Accordingly, the new data record DRA is associated with the electronic receipt service designated by the user. The processor 11 sets the user identifier and the password designated by the user in the fields FAB and FAC of the new data record DRA, respectively. The processor 11 sets the address of the receipt server 20 compatible with the associated electronic receipt service in the field FAD of the new data record DRA. The processor 11 sets predetermined invalid data in the field FAE of the new data record DRA, the invalid data not indicating the actual date and time. The processor 11 may leave the field FAE blank.

In a case where the user uses a plurality of electronic receipt services, the user registers each of those electronic receipt services. Thus, in this case, a plurality of data records DRA with which the plurality of electronic receipt services are associated is contained in the management database DBA.

When the user completes a transaction at a store that is a member of an electronic receipt service for which the use registration has been performed, the transaction data is transmitted from the POS system 40 provided at the store to the receipt server 20 compatible with the corresponding electronic receipt service. The receipt server 20 stores electronic receipt data based on thus transmitted transaction data in association with the user identifier of the user. That is, the electronic receipt data is associated with one transaction and contains the store identifier of the store where the transaction has been performed and transaction date and time. Moreover, the electronic receipt data contains, for example, a commodity code, the number of commodities, a unit price, and the like with respect to the commodity which has been a target of the transaction. When the user repeats transactions at a store that is a member of a certain electronic receipt service, a plurality of pieces of electronic receipt data is stored in the receipt server 20 compatible with the electronic receipt service in association with the user identifier of the corresponding user. Typically, in the electronic receipt service, by the user accessing the receipt server 20 from an arbitrary information terminal, a receipt screen showing an account for each transaction is displayed on the information terminal, such that the user can view the receipt screen.

Figure 4:
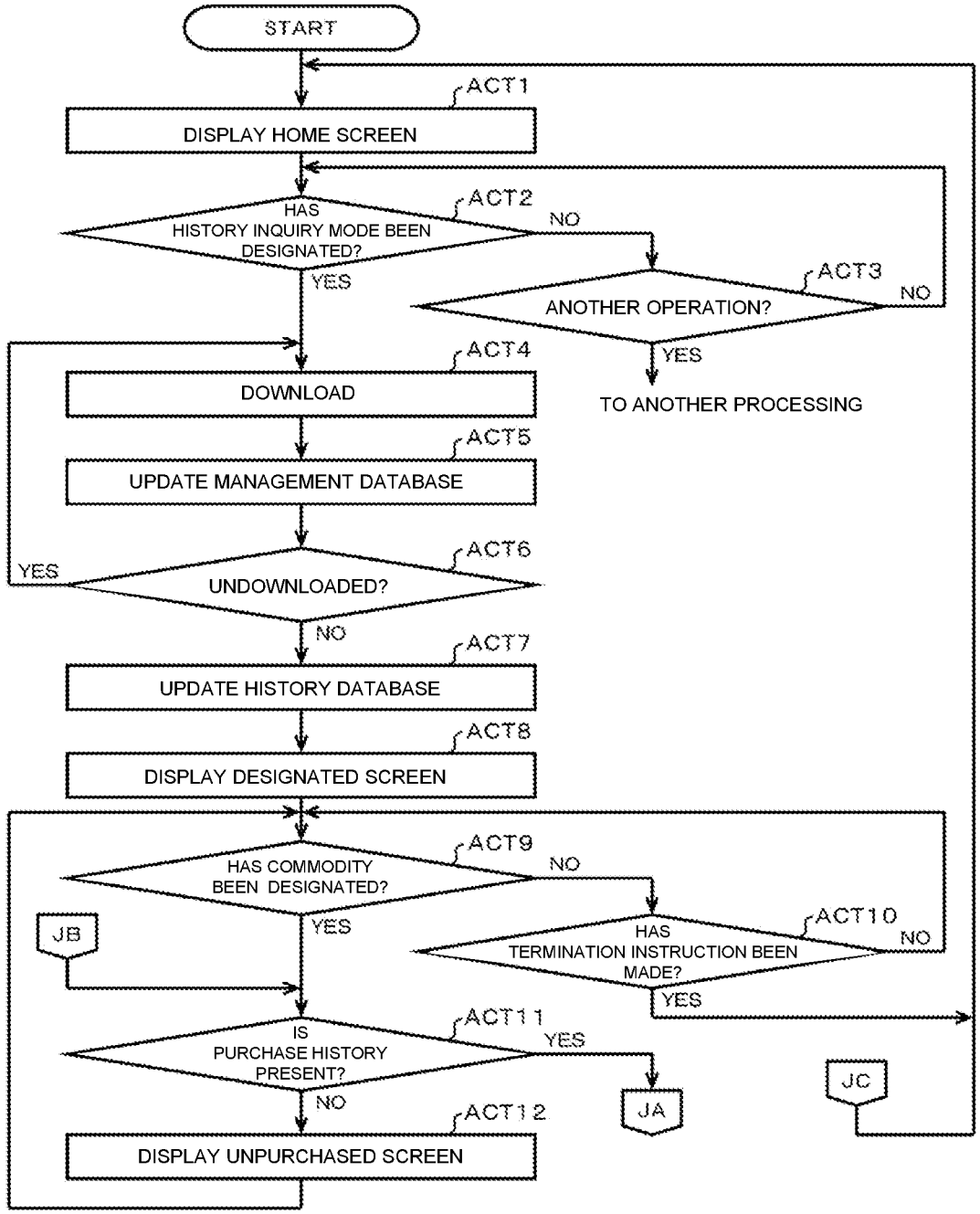
FIG. 4 is a flowchart of a receipt client processing according to the embodiment.
Figure 5:
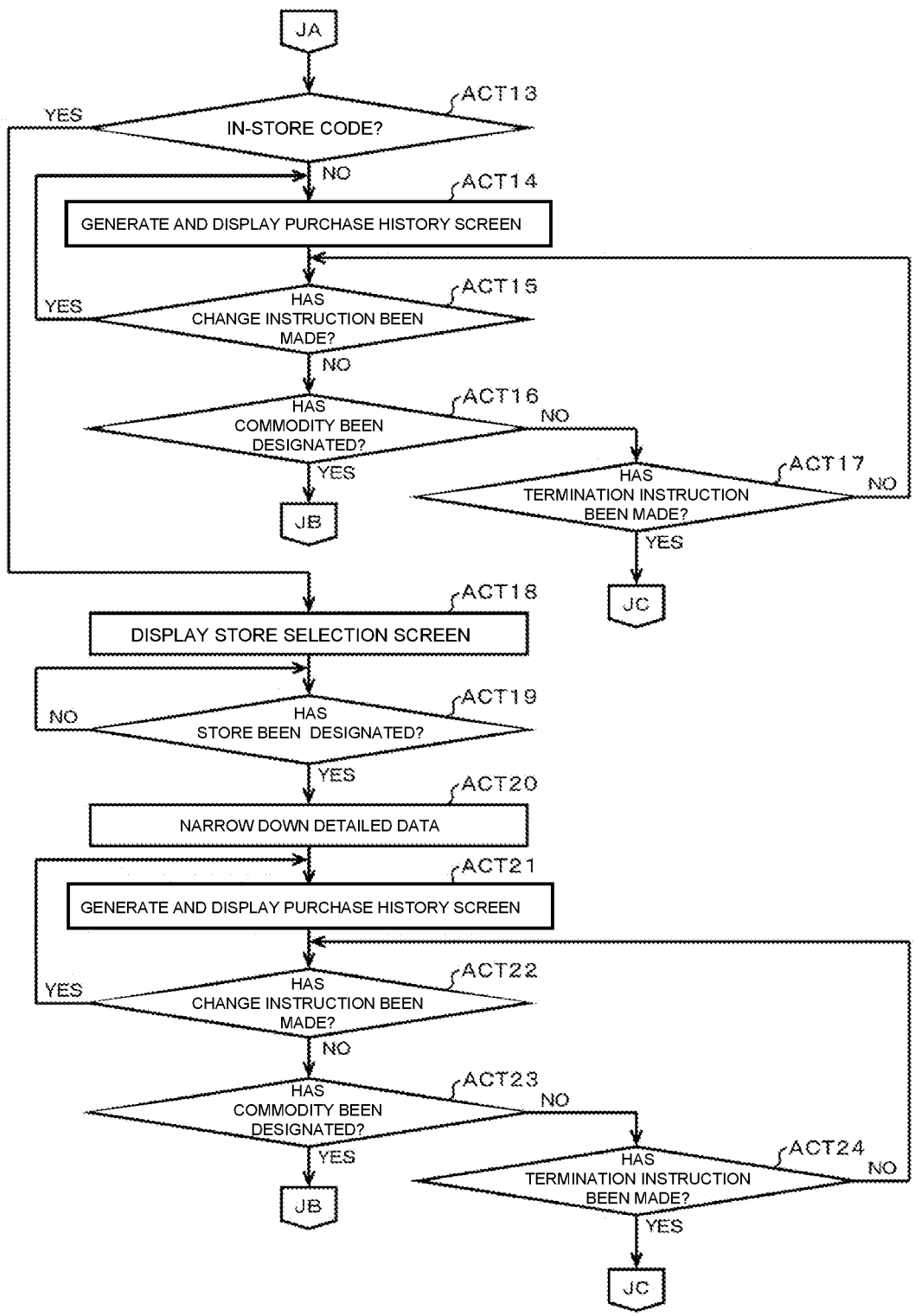
FIG. 5 is a flowchart of the receipt client processing according to the embodiment.

When execution of the application based on the receipt client app APA is instructed, the processor 11 of the information providing apparatus 10 starts information processing based on the receipt client app APA (hereinafter, referred to as receipt client processing). FIGS. 4 and 5 are flowcharts showing the receipt client processing.

In ACT1 of FIG. 4, the processor 11 causes the touch panel 14, for example, to display a home screen. The home screen is a screen for starting operations of various functions provided by the receipt client processing.

In ACT2, the processor 11 determines whether or not an history inquiry mode has been designated. In a case where it is determined that the history inquiry mode is not designated (NO in ACT2), i.e., in a case where it cannot be confirmed that the corresponding designation has been made, the processing of the processor 11 proceeds to ACT3. In ACT3, the processor 11 determines whether or not another operation (any valid operation) has been made. In a case where the processor 11 determines that any valid operation has not been made (NO in ACT3), the processing of the processor 11 returns to ACT2. Then, the processor 11 waits for any valid operation including the designation of the history inquiry mode to be made in ACT2 and ACT3. In a case where it is determined that any operation other than the designation of the history inquiry mode has been made (YES in ACT3), the processing of the processor 11 shifts to processing for performing the function in accordance with the operation. The processing of the processor 11 in this case is not a feature of the embodiment, and thus the description thereof is omitted. The processing for displaying the receipt screen showing the account of each transaction as described above may be one of the processing in this case.

In a case where the user wishes to check the purchase history of a certain commodity while looking around a store for commodities for example, the user performs a predetermined operation for activating the history inquiry mode through the touch panel 14, for example. It should be noted that the operation is, for example, a tap of a soft key arranged on the home screen.

In a case where it is determined that the history inquiry mode is designated (YES in ACT2), the processing of the processor 11 proceeds to ACT4. In ACT4, the processor 11 downloads the electronic receipt data that has not yet been downloaded with respect to one of the electronic receipt services registered in the information providing apparatus 10. For example, the processor 11 selects a data record DRA of the data records DRA contained in the management database DBA, which corresponds to the one of the electronic receipt services. The processor 11 then requests downloading with notification of the user identifier, the password, and the date and time set in the fields FAB, FAC, and FAE to the address set in the field FAD of the selected data record DRA. The receipt server 20 receiving the request authenticates the user on the basis of the notified user identifier and the password and then downloads the electronic receipt data acquired with respect to the corresponding user after the notified date and time to the information providing apparatus 10. In a case where the electronic receipt data is received by the communication interface 16, the processor 11 in the information providing apparatus 10 stores the electronic receipt data in the main memory 12 or in the auxiliary storage device 13. Accordingly, the electronic receipt data containing the identifiers (commodity codes) of the commodities that have been traded as transaction targets is collected from the plurality of receipt servers 20 each corresponding to the data management apparatus. By the processor 11 performing the information processing based on the receipt client app APA in this manner, the computer having the processor 11 as the central portion functions as a collection means.

In ACT5, the processor 11 updates the management database in order to reflect the current download to the management. For example, the processor 11 updates the date and time set in the field FAE of the data record DRA selected in ACT4 to indicate the latest download date and time. For example, the processor 11 rewrites the value of the field FAE to a numerical value indicating the date and time when the download was requested.

In ACT6, the processor 11 determines whether or not an electronic receipt service that has not yet been downloaded for this time is present. For example, in a case where the data records DRA contained in the management database DBA include a data record DRA different from the data record DRA selected in ACT4, the processor 11 determines that the corresponding electronic receipt service is present (YES in ACT6). The processing of the processor 11 then returns to ACT4 and the processor 11 repeats the processing of ACT4 and ACT5 in a manner similar to that described above. It should be noted that when the processor 11 performs the processing of ACT4 for the second time or later, the processor 11 selects a data record DRA of the electronic receipt service different from the data record DRA of the electronic receipt service previously selected in ACT4.

The processor 11 downloads electronic receipt data that has not yet been downloaded with respect to all of the registered electronic receipt services in this manner. In a case where it is determined that the electronic receipt service that has not yet been downloaded is not present (NO in ACT6), i.e., after the downloading of all the registered electronic receipt services has been completed, the processing of the processor 11 proceeds to ACT7.

In ACT7, the processor 11 updates the history database DBB on the basis of the electronic receipt data downloaded this time. For example, the processor 11 determines whether or not the data record DRB with the commodity code set in the field FBA is contained in the history database DBB with respect to each of the commodity codes contained in the electronic receipt data downloaded this time. In a case where the data record DRB is not contained in the history database DBB, the processor 11 adds a new data record DRB to the history database DBB. The processor 11 sets the corresponding commodity code in the field FBA of the new data record DRB and sets detailed data in the field FBB. The processor 11 sets the store identifier and the transaction data indicated by the corresponding electronic receipt data (the transaction date and time and the number of commodities and the unit price indicated by the corresponding electronic receipt data with respect to the corresponding commodity code) in the fields FCA to FCD of the detailed data, respectively. Moreover, for example, the processor 11 adds new detailed data to the data record DRB in a case where the data record DRB with the commodity code set in the field FBA has already been contained in the history database DBB with respect to each of the commodity codes contained in the electronic receipt data downloaded this time. Then, the processor 11 sets the store identifier and the transaction date and time, which are indicated by the corresponding electronic receipt data, and the number of commodities and the unit price, which are indicated by the corresponding electronic receipt data with respect to the corresponding commodity code, in the fields FCA to FCD of the new detailed data, respectively. It should be noted that the processor 11 adds the new detailed data to the data record DRB, for example, in order from the detailed data having earlier transaction date and time. By the processor 11 performing the information processing based on the receipt client app APA in this manner, the computer having the processor 11 as the central portion functions as an update means.

Figure 6:
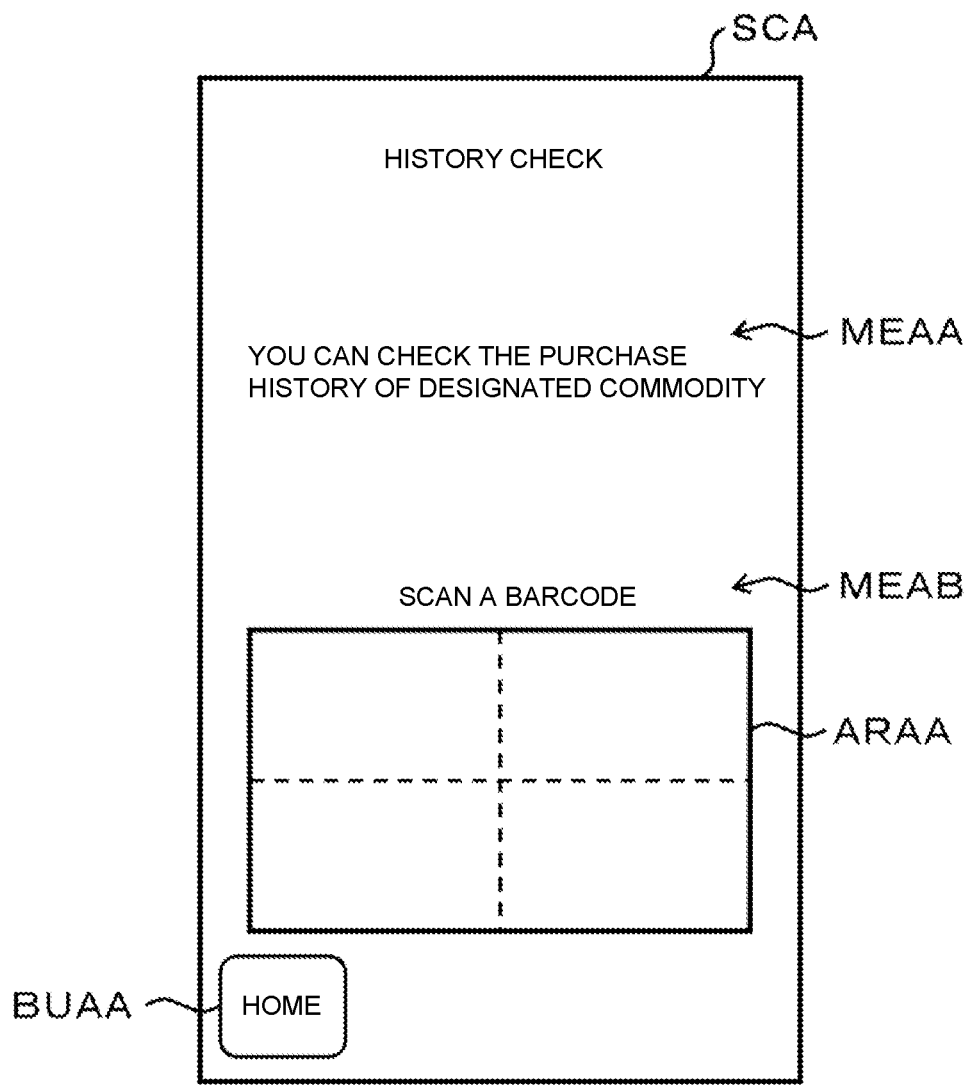
FIG. 6 is a diagram showing example of a designation screen according to the embodiment.

In ACT8, the processor 11 causes the touch panel 14, for example, to display a designation screen. The designation screen is a screen for allowing the user to designate a commodity the history of which is to be checked. FIG. 6 is a diagram showing an example of a designation screen SCA. The designation screen SCA has a display area ARAA, messages MEAA and MEAB, and a button BUAA. The display area ARAA is displayed such that vertical and horizontal center lines are superimposed on an image obtained by the camera 15. It should be noted that the image obtained by the camera 15 is not shown in FIG. 6. The message MEAA is a character message for telling the user that an operating state for checking the purchase history of the commodity is provided. The message MEAB is a character message for prompting the user to scan the barcode of the commodity the history of which is to be checked. The button BUAA is a soft key for the user to instruct to terminate the history inquiry mode.

In ACT9, the processor 11 determines whether or not the commodity has been designated. In a case where it is determined that the commodity has not been designated (NO in ACT9), i.e., in a case where it cannot be confirmed that the corresponding designation has been made, the processing of the processor 11 proceeds to ACT10. In ACT10, the processor 11 determines whether or not an instruction to terminate the history inquiry mode has been made. In a case where it is determined that the instruction to terminate the history inquiry mode has not been made (NO in ACT10), i.e., in a case where it cannot be confirmed that the corresponding instruction has been made, the processing of the processor 11 returns to ACT9. Then, the processor 11 waits for a commodity to be designated or for a termination instruction to be made in ACT9 and ACT10.

The user designates a commodity the purchase history of which is wished to be checked by a predetermined operation. For example, the user directs the camera 15 to the commodity such that the barcode of the corresponding commodity appears in the displayed area ARAA. When causing the designation screen SCA to be displayed, the processor 11 analyzes an image obtained by the camera 15 and attempts to read the commodity code indicated by the barcode. The reading of the barcode may be performed as processing based on the receipt client app APA or may be performed as processing based on another application program for reading the barcode. When the commodity code has been read, the processor 11 determines that the commodity identified by the commodity code has been designated (YES in ACT9). The processing of the processor then proceeds to ACT11. At this time, the processor 11 acquires the commodity code indicated by the read barcode as the identifier of the commodity. By the processor 11 performing the information processing based on the receipt client app APA in this manner, the computer having the processor 11 as the central portion functions as an acquisition means.

In ACT11, the processor 11 determines whether or not a purchase history of the designated commodity is present. For example, the processor 11 searches the history database DBB for a data record DRB with the commodity code of the designated commodity which is set in the field FBA. In a case where it is determined that the purchase history of the designated commodity is not present (NO in ACT11), i.e., in a case where the corresponding data record DRB cannot be found, the processing of the processor 11 proceeds to ACT12. In ACT12, the processor 11 causes the touch panel 14, for example, to display a "unpurchased" screen. The "unpurchased" screen is a predetermined screen for notifying the user that the purchase history is not present. For example, the "unpurchased" screen may be a screen displaying a character message indicating that the purchase history is not present instead of the message MEAA on the designation screen SCA of FIG. 6. The processing of the processor 11 then returns to the standby state of ACT9 and ACT10.

In a case where the processor 11 determines that the purchase history of the designated commodity is present (YES in ACT11), i.e., in a case where the data record DRB with the commodity code of the designated commodity which is set in the field FBA can be found, the processing of the processor 11 proceeds to ACT13 shown in FIG. 5. In ACT13 of FIG. 5, the processor 11 determines whether or not the commodity code of the designated commodity is an in-store code. In a case where it is determined that the commodity code of the designated commodity is not the in-store code (NO in ACT13), the processing of the processor 11 proceeds to ACT14.

In ACT14, the processor 11 generates data on a purchase history screen and causes the touch panel 14, for example, to display the purchase history screen. For example, the processor 11 selects one of all pieces of detailed data (transaction data) contained in the data record DRB found as described above and generates data on the purchase history screen to display the data contained in the detailed data. It should be noted that the processor 11 selects, for example, detailed data set in the last field of the data record DRB. In this way, detailed data on the latest transaction is selected first. However, the processor 11 may select detailed data set in the field FBB of the data record DRB. In this way, detailed data on the oldest transaction is selected first. The processor 11 may select detailed data that meets predetermined conditions. It should be noted that the conditions may be determined as appropriate by a creator of the receipt client app APA or the user, for example.

Figure 7:
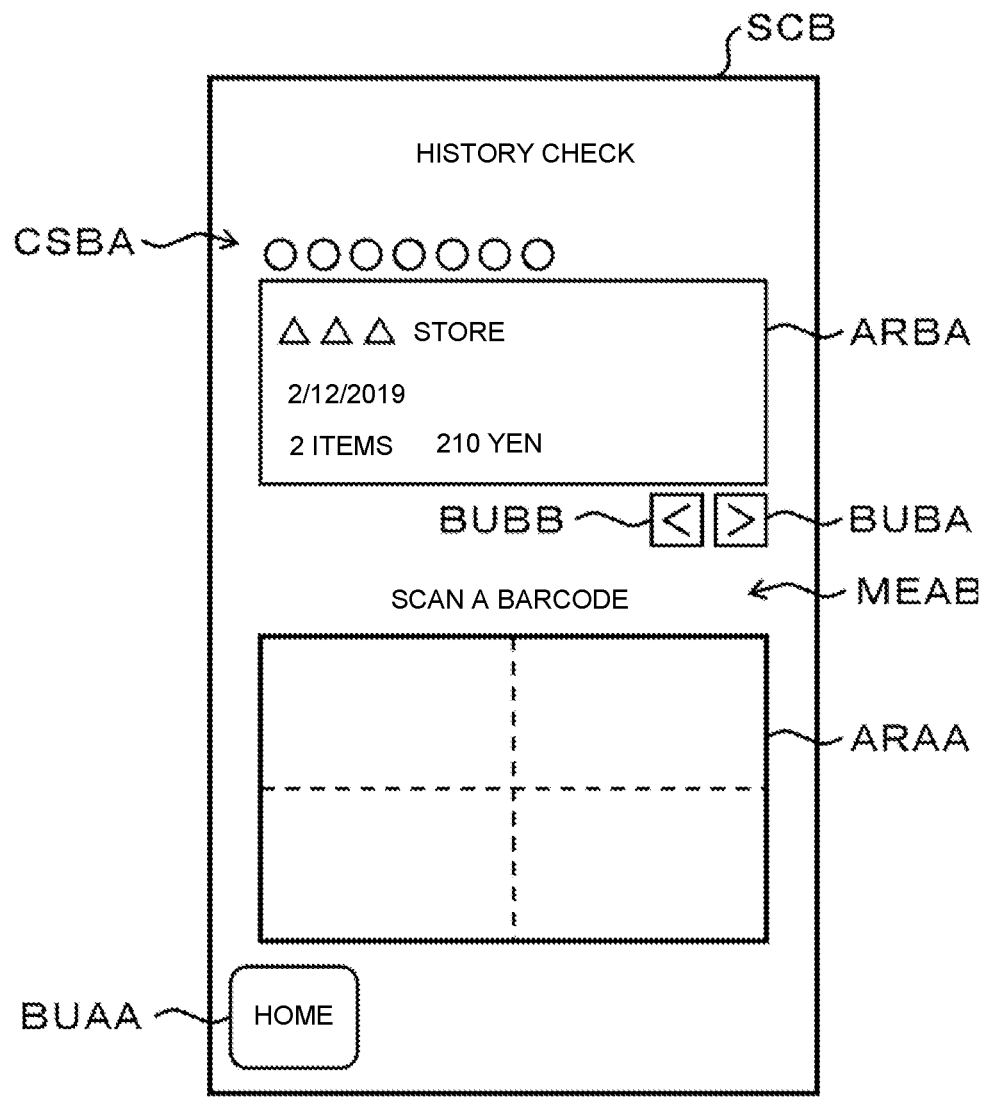
FIG. 7 is a diagram showing an example of a purchase history screen according to the embodiment.

FIG. 7 is a diagram showing an example of a purchase history screen SCB. It should be noted that in FIG. 7, the same display elements as the display elements contained in the designation screen SCA shown in FIG. 6 will be denoted by the same reference signs and the descriptions thereof will be omitted. In the embodiment, the purchase history screen SCB has a character string CSBA, a display area ARBA, and buttons BUBA and BUBB in place of the message MEAA on the purchase history screen SCB. The character string CSBA indicates a commodity name of the designated commodity. The display area ARBA displays data contained in the detailed data. The buttons BUBA and BUBB are soft keys for the user to make an instruction to display another purchase history.

In ACT15 of FIG. 15, the processor 11 determines whether or not an instruction to change a purchase history to be displayed has been made. In a case where it is determined that the instruction to change the purchase history to be displayed has not been made (NO in ACT15), the processing of the processor 11 proceeds to ACT16. In ACT16, the processor 11 determines whether or not a commodity has been designated. In a case where it is determined that the commodity has not been designated (NO in ACT16), the processing of the processor 11 proceeds to ACT17. In ACT17, the processor 11 determines whether or not an instruction to terminate the history inquiry mode has been made. In a case where the processor 11 determines that the instruction to terminate the history inquiry mode has not been made (NO in ACT17), the processing of the processor 11 returns to ACT15. Then, the processor 11 waits for a change or termination instruction to be made or a commodity to be designated in ACT15 or ACT17.

In a case where the user wishes to check a purchase history different from the purchase history displayed on the purchase history screen SCB (see FIG. 7), the user performs a predetermined operation such as touching either the button BUBA or BUBB on the purchase history screen SCB, for example. Accordingly, the user makes an instruction to change the purchase history displayed on the purchase history screen SCB. Then, in ACT15, it is determined that the instruction to change the purchase history to be displayed has been made (YES in ACT15), and the processing of the processor 11 returns to ACT14. In ACT14, the processor 11 performs processing similar to that described above. Then, the processing of the processor 11 returns to the standby state of ACT15 or ACT17. It should be noted that when the processor 11 performs the processing of ACT14 for the second time or later, the processor 11 selects detailed data different from the detailed data previously selected in ACT14. The processor 11 then updates the display area ARBA to display data contained in the detailed data. The conditions under which the processor 11 newly selects detailed data may be determined as appropriate by the creator of the receipt client app APA or the user, for example. As an example, the processor 11 newly selects detailed data set in the field subsequent to the field in which the currently selected detailed data is set, in response to the touch of the button BUBA. As another example, the processor 11 newly selects detailed data set in the field previous to the field in which the currently selected detailed data is set, in response to the touch of the button BUBB. The purchase history screen SCB is thus updated to display the purchase history in chronological order as long as the detail data is set in a more previous field as it has earlier transaction date and time in the data record DRB as described above.

The data on the plurality of purchase history screens SCB for displaying the purchase history in chronological order corresponds to history data indicating the transaction history of the designated commodity. That is, sequentially generating data for displaying the purchase history screen SCB and sequentially displaying the purchase history screen SCB corresponding to the data corresponds to generating and outputting the history data. By the processor 11 performing the information processing based on the receipt client app APA in this manner, the computer having the processor 11 as the central portion functions as a generation means and an output means.

In a case where the processor 11 determines in ACT13 shown in FIG. 5 that the commodity code of the designated commodity is the in-store code (YES in ACT13), the processing of the processor 11 proceeds to ACT18. In ACT18, the processor 11 causes the touch panel 14, for example, to display a store selection screen. The store selection screen is a screen for allowing the user to select one of the stores having the purchase history of the designated commodity. For example, the processor 11 displays, on the store selection screen, store names identified by the store identifiers set in the fields FCA of the detailed data contained in the data records DRB with the commodity code of the designated commodity which is set in the fields FBA as options.

The user selects a store with respect to which the purchase history is wished to be checked from among the stores displayed as the options on the store selection screen. The user performs a predetermined operation for designating the selected store. In ACT19 of FIG. 5, the processor 11 waits for a store to be designated by determining whether or not a store has been designated. In a case where it is determined that the store has been designated (YES in ACT19), the processing of the processor 11 proceeds to ACT20. At this time, the processor 11 determines the designated store as a store with respect to which the history is to be checked. By the processor 11 performing the information processing based on the receipt client app APA in this manner, the computer having the processor 11 as the central portion functions as a determination means.

In ACT20, the processor 11 narrows down pieces of detailed data to be referred to for displaying the purchase history to pieces of detailed data related to the designated store. For example, the processor 11 extracts a piece of detailed data with the store identifier of the designated store which is set in the field FCA from among pieces of detailed data contained in the data records DRB with the commodity code of the designated commodity which is set in the fields FBA. The processor 11 sets the extracted piece of detailed data as the detailed data to be referred to. In ACT21, the processor 11 generates, as in ACT14, data for the purchase history screen SCB and causes the touch panel 14, for example, to display the purchase history screen SCB. It should be noted that the processor 11 selects one of the pieces of detailed data narrowed down in ACT20 in ACT21.

In ACT22, the processor 11 determines whether or not an instruction to change the purchase history to be displayed has been made. In a case where it is determined that the instruction to change the purchase history to be displayed has not been made (NO in ACT22), the processing of the processor 11 proceeds to ACT23. In ACT23, it is determined whether or not a commodity has been designated. In a case where the processor 11 determines that the commodity has not been designated (NO in ACT23), the processing of the processor 11 proceeds to ACT24. In ACT24, the processor 11 determines whether or not an instruction to terminate the history inquiry mode has been made. In a case where it is determined that the instruction to terminate the history inquiry mode has not been made (NO in ACT24), the processing of the processor 11 returns to ACT22. Then, the processor 11 waits for an instruction to change the purchase history to be displayed or terminate the history inquiry mode to be made or a commodity to be designated in ACT22 or ACT24.

When the user makes an instruction to change the purchase history in a manner similar to that described above, the processor 11 determines in ACT22 that the instruction to change the purchase history to be displayed has been made. Then, the processing of the processor 11 returns to ACT21. In ACT21, the processor 11 performs processing similar to that described above. Then, the processing of the processor 11 returns to the standby state of ACT22 or ACT24. It should be noted that when the processor 11 performs the processing of ACT21 for the second time or later, the processor 11 selects a piece of detailed data different from the detailed data previously selected in ACT14 from the pieces of detailed data narrowed down in ACT20.

In a case where the user wishes to check the purchase history of another commodity while the above-mentioned "unpurchased" screen is displayed, the user directs the camera 15 to the commodity such that the barcode of the commodity appears in the display area ARAA of the "unpurchased" screen. Then, it is determined in ACT9 described above (see FIG. 4) that the commodity has been designated (YES in ACT9), and the processing of the processor 11 proceeds to ACT11. In a case where the user wishes to check the purchase history of another commodity while the purchase history screen SCB is displayed, the user directs the camera 15 to the commodity such that the barcode of the commodity appears in the display area ARAA of the purchase history screen SCB. Then, the processor 11 determines in ACT16 (see FIG. 5) or ACT23 (see FIG. 5) described above that the commodity has been designated (YES in ACT16 or ACT23), and the processing of the processor 11 proceeds to ACT11 of FIG. 4. The processor 11 performs the processing of ACT11 and the processing subsequent to ACT11 in a manner similar to that described above. Accordingly, the processor 11 displays the purchase history of the newly designated commodity on the touch panel 14.

Moreover, in a case where the user checks the purchase history in a case where any one of the designation screen SCA, the "unpurchased" screen, and the purchase history screen SCB is displayed, the user instructs the end by predetermined operations such as touching the buttons BUAA on the respective screens. In a case where the end is instructed in this manner, it is determined in the above-described ACT10 (see FIG. 4), ACT17 (see FIG. 5), or ACT24 (see FIG. 5) that the end of the history inquiry mode is instructed (ACT10, ACT17 or yes in ACT24), and the processing of the processor 11 returns to ACT1 of FIG. 4. The processor 11 performs the processing of ACT1 and the processing subsequent to ACT1 in a manner similar to that described above.

As described above, the information providing apparatus 10 displays the purchase history across the plurality of electronic receipt services. Accordingly, it is possible to reduce the time and effort of the customer to check the transaction history.

Moreover, the information providing apparatus 10 sequentially updates the history database DBB stored in the auxiliary storage device 13 and displays the purchase history on the basis of the history database DBB. Therefore, it is possible to reduce the amount of data of the transaction data to be collected for each update of the history database DBB and it is possible to reduce the processing time for updating the history database DBB and also the processing time for displaying the purchase history on the basis of the updated history database DBB.

Moreover, in a case where the in-store code is designated for designating the commodity, the information providing apparatus 10 displays only the purchase history related to the designated store. Accordingly, even if the same in-store code is used for identifying different commodities in a plurality of stores, the purchase history in which those commodities are mixed is not displayed.

Moreover, with the information providing apparatus 10, the user can easily check the purchase history through the display of the display device provided therein.

The following various modifications of the above-mentioned embodiment can be made. The transactions can be in any form such as sales of commodities to customers at a store, sales of commodities to customers by mail order, offer of food and beverages or the like consumed by customers at a store, and offer of intangible services to customers.

The commodity code of a commodity the history of which is to be displayed may be acquired by any method other than the barcode reading, such as designation from a commodity list having a purchase history, for example.

Collected pieces of electronic receipt data may be stored in the main memory 12 or the auxiliary storage device 13 as it is, and data on the history screen may be generated from those electronic receipt data.

The electronic receipt data may be downloaded from the receipt server 20 every time the history inquiry mode is activated.

It is also possible to display a purchase history screen displaying a list of a plurality of purchase histories rather than displaying the purchase history screen SCB.

Alternatively, the output of the purchase history may be performed by any method other than the display, such as output of a voice message, printing, or data output to another apparatus.

In determining a store with respect to which the purchase history is to be indicated in a case where the commodity code of the designated commodity is an in-store code, the store that the user is visiting may be automatically determined by a well-known determination method, for example.

Some or all of the functions achieved by the processor 11 in the information processing may be achieved by hardware that executes information processing not based on a program, such as a logic circuit. Alternatively, each of the above-mentioned functions may be achieved by combining software control with hardware such as the logic circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information providing apparatus that receives, from a plurality of data management apparatus, each of which manages electronic receipt data obtained by digitizing a receipt related to a transaction of a commodity, the electronic receipt data and provides information for checking a transaction history of the commodity to a user on a basis of the electronic receipt data, the information providing apparatus comprising:

a communication interface that communicates with a first data management apparatus that operates a first electronic receipt service and a second data management apparatus that operates a second electronic receipt service different from the first electronic receipt service, and receives a plurality of pieces of electronic receipt data, each piece of the electronic receipt data containing one or more commodity codes of already traded transaction target commodities in a transaction and transaction data of the already traded transaction target commodities in the transaction, each commodity code being a commodity identifier;

a touch panel;

a storage device;

a code reader that reads a code symbol representing a commodity code and obtains the commodity code represented by the read code symbol; and a processor that generates, in the storage device, a management database including a first management data record in which a first user identifier of the user using the first electronic receipt service and a first address of the first data management apparatus operating the first electronic receipt service are set in association with a first service identifier for identifying the first electronic receipt service, and a second management data record in which a second user identifier of the user using the second electronic receipt service and a second address of the second data management apparatus operating the second electronic receipt service are set in association with a second service identifier for identifying the second electronic receipt service, generates, in the storage device, a transaction history database including one or more history data records, in a case where the touch panel receive a user instruction for inquiring about transaction history, transmit a first download request for first electronic receipt data including the first user identifier to the first data management apparatus at the first address set in the first management data record and a second download request for second electronic receipt data including the second user identifier to the second data management apparatus at the second address set in the second management data record, and receives the first and second electronic receipt data from the first and second management apparatuses, respectively, via the communication interface, generates, from the first and second electronic receipt data, a plurality of history data records in the transaction history database, each of the history data records being associated with a unique commodity code and includes one or more transaction histories, each transaction history being associated with a specific store and including transaction details of commodity identified by the associated unique commodity code at the specific store, the plurality of history data records in the transaction history database being searchable by commodity codes, in a case where the code reader obtains the commodity code, performs a search for a history data record associated with the obtained commodity code in the transaction history database stored in the storage device and obtains the one or more transaction histories from a history data record found through the search, and generates history data indicating the obtained transaction histories and causes the touch panel to display a transaction history screen according to the generated history data.

2. The information providing apparatus according to claim 1, wherein the processor updates the history data records contained in the transaction history database on a basis of newly received electronic receipt data.

3. The information providing apparatus according to claim 2, wherein the processor determines whether or not a history data record associated with a commodity code contained in the newly received electronic receipt data is included in the transaction history database, in a case where the history data record associated with the commodity code is included in the transaction history database, adds transaction history corresponding to the newly received electronic receipt data to the history data record, and in a case where the history data record associated with the commodity code is not included in the transaction history database, generates a new history data record in the transaction history database, the new history data record being associated with the commodity code and containing the transaction history corresponding to the newly received electronic receipt data.

4. The information providing apparatus according to claim 2, wherein the processor updates information about date and time, which is contained in the first and second management data records, every time new electronic receipt data is received.

5. The information providing apparatus according to claim 4, the processor determines whether or not the first and second electronic receipt data have been received from first and second data management apparatuses on a basis of the information about the date and time which is contained in the first and second management data records, and causes the display device to display a designation screen to designate a commodity of which transaction history is to be checked in a case where the first and second electronic receipt data have been collected from first and second data management apparatuses.

6. The information providing apparatus according to claim 5, wherein the code reader is a camera that takes an image of the code symbol, and the processor causes the designation screen to display the image taken by the camera, and acquires the commodity code on a basis of the image taken by the camera.

* * * * *